US008340494B2

(12) United States Patent
Maeoka

(10) Patent No.: US 8,340,494 B2
(45) Date of Patent: Dec. 25, 2012

(54) IMAGE CONVERTER, IMAGE REPRODUCER, IMAGE CONVERSION/REPRODUCTION SYSTEM, AND RECORDING MEDIUM

(75) Inventor: Jun Maeoka, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 432 days.

(21) Appl. No.: 12/619,469

(22) Filed: Nov. 16, 2009

(65) Prior Publication Data

US 2010/0124408 A1 May 20, 2010

(30) Foreign Application Priority Data

Nov. 17, 2008 (JP) ................................ 2008-293249

(51) Int. Cl.
*H04N 5/765* (2006.01)
*H04N 9/80* (2006.01)

(52) U.S. Cl. ......... 386/232; 386/200; 386/239; 386/248
(58) Field of Classification Search ........... 386/239–248
See application file for complete search history.

(56) References Cited

U.S. PATENT DOCUMENTS

| | | | | |
|---|---|---|---|---|
| 2003/0169935 A1* | 9/2003 | Sano et al. | ................... | 382/240 |
| 2003/0190142 A1* | 10/2003 | Togashi et al. | ................... | 386/52 |
| 2005/0169545 A1* | 8/2005 | Ratakonda et al. | ........... | 382/238 |
| 2006/0072672 A1* | 4/2006 | Holcomb et al. | ........ | 375/240.25 |
| 2006/0212907 A1 | 9/2006 | Akiyama et al. | | |
| 2008/0040497 A1* | 2/2008 | Venkatramani et al. | ...... | 709/231 |

FOREIGN PATENT DOCUMENTS

| | | |
|---|---|---|
| JP | 2001-045436 | 2/2001 |
| JP | 2003-134386 A | 5/2003 |
| JP | 2003-179888 A | 6/2003 |
| JP | 2008-167143 A | 7/2003 |
| JP | 2003-274415 A | 9/2003 |
| JP | 2004-200989 A | 7/2004 |
| JP | 2005-277869 A | 10/2005 |
| JP | 2006-211207 A | 8/2006 |
| JP | 2006-340066 A | 12/2006 |
| JP | 2007-116418 | 5/2007 |
| JP | 2007-251887 A | 9/2007 |
| JP | 2008-206060 A | 9/2008 |

OTHER PUBLICATIONS

Suzuki, K. I., "Live HD Sumo Match Video Scenes Retrieved, Enlarged, and Displayed on Mobile Phone Set", The Journal of the Institute of Image Information and Television Engineers, Jul. 1, 2007, vol. 61, No. 7, pp. 1017-1020.

* cited by examiner

*Primary Examiner* — Thai Tran
*Assistant Examiner* — Hung Dang
(74) *Attorney, Agent, or Firm* — Cozen O'Connor

(57) ABSTRACT

An image converter includes an image converting unit and a determining unit. The image converting unit acquires frame image groups each including one or more frame images from original image data, and outputs the frame image(s) of each acquired group, converting its/their image quality based on determination by the determining unit, generating foreign-device-use image data including the frame image groups including the frame image(s). The determining unit determines necessity of first-image-quality retention of the frame image(s) of each group based on whether it/they satisfies/satisfy a condition. The image converting unit outputs the frame image(s) of the group at the first image quality if it/they is/are determined by the determining unit as necessary to retain at the first image quality, or a second image quality if determined as unnecessary to retain at the first image quality.

13 Claims, 15 Drawing Sheets

FIG. 7

602 HIGH RESOLUTION SCENE MANAGING TABLE

| FRAME NUMBER | REPRODUCTION START TIME |
|---|---|
| 0 | 0 MIN 0 SEC |
| 50 | 1 MIN 35 SEC |
| 100 | 4 MIN 28 SEC |
| ⋮ | ⋮ |

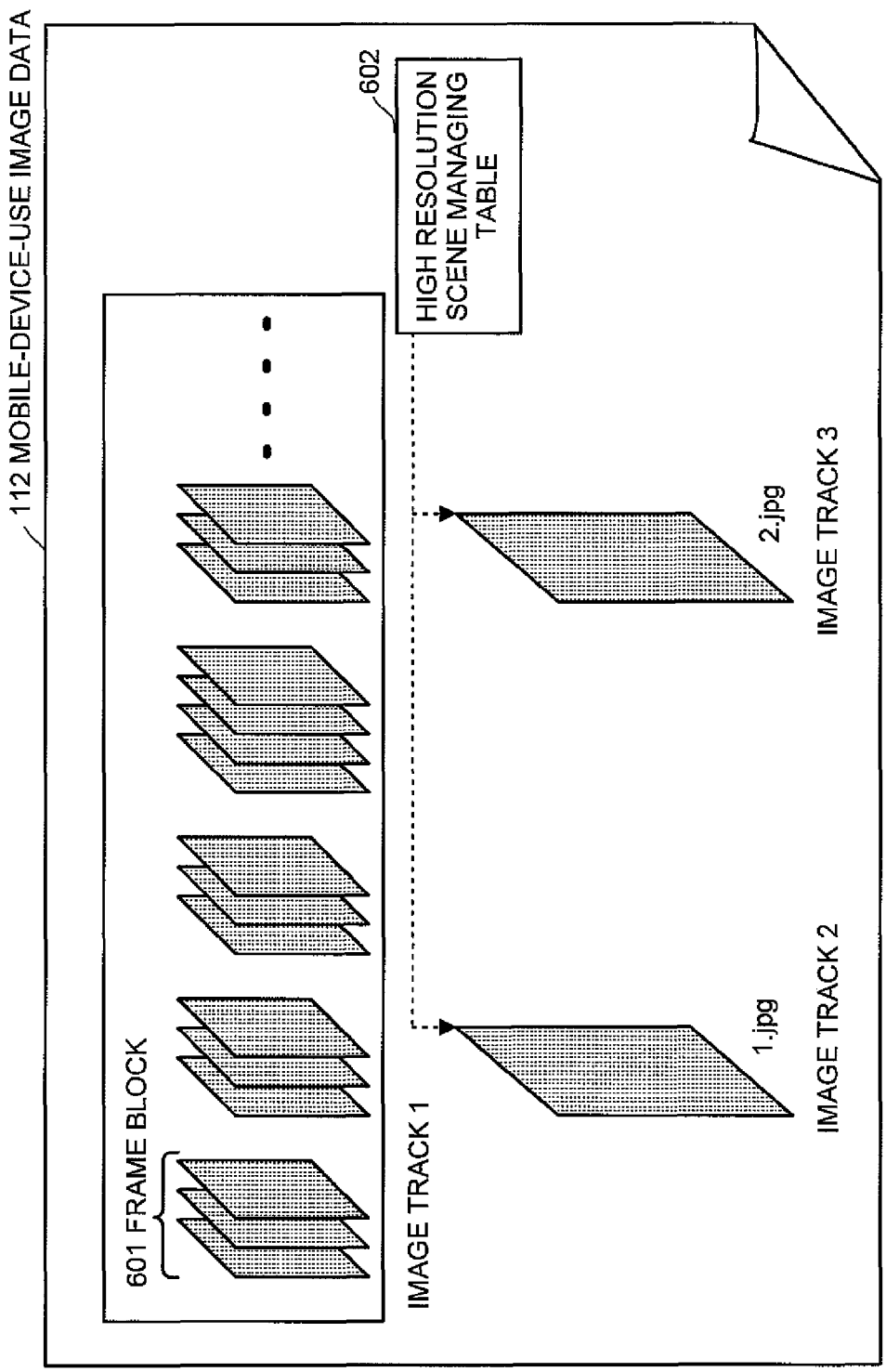

FIG. 15A

602 HIGH RESOLUTION SCENE MANAGING TABLE

| TRACK NUMBER | START TIME |
|---|---|
| 2 | 0 MIN 0 SEC |
| 4 | 1 MIN 35 SEC |
| 8 | 4 MIN 28 SEC |
| ⋮ | ⋮ |

FIG. 15B

602 HIGH RESOLUTION SCENE MANAGING TABLE

| IMAGE TITLE | TRACK NUMBER | START TIME |
|---|---|---|
| 1.jpg | 2 | 0 MIN 0 SEC |
| 2.jpg | 3 | 1 MIN 35 SEC |
| 3.jpg | 4 | 4 MIN 28 SEC |
| ⋮ | ⋮ | ⋮ |

IMAGE CONVERTER, IMAGE REPRODUCER, IMAGE CONVERSION/REPRODUCTION SYSTEM, AND RECORDING MEDIUM

BACKGROUND OF THE INVENTION

1. Field of the Invention

The present invention relates to an image converter, an image reproducer, an image conversion/reproduction system, and a program.

2. Description of the Related Art

Recently, image display devices such as TVs have progressed remarkably, and various types of devices with a capability of high resolution or high pixel count display have been developed and used in ordinary households. Display devices mounted on mobile terminals such as cellular phones, etc. have also come with upgraded capabilities.

However, cellular phones, etc. are more preferable if they are smaller and lighter, and hence usually mounted with a CPU, a memory device, etc. that are lower-powered than those mounted on TVs, etc. Therefore, when transferring image data having a high image quality that is created for reproduction on TVs, DVD recorders, etc., to cellular phones, etc. to reproduce the image data on the cellular phones, etc., it is necessary to convert or degrade the image quality of the image data to an image quality matching the capabilities of the cellular phones, etc., i.e., to a lower image quality. Degrading is to lower, for example, resolution, bit rate, etc. Degrading can compress the overall size of the image data and reduce the decoding load.

For example, Unexamined Japanese Patent Application KOKAI Publication No. 2001-45436 discloses a digital broadcast receiver that converts received image data to image data adapted to an external device connected to it.

Conventional data conversion techniques degrade uniformly all the frames that constitute high quality image data (e.g., MPEG data). Therefore, cellular phones, etc. will reproduce image data whose image quality has been lowered uniformly for all the frames. Image data that has been recorded at a high image quality can only be viewed at a low image quality when users reproduce the image data on a cellular phone, etc. If image data that has been degraded uniformly throughout its frames contains information with a very small size, e.g., small-sized letters, users cannot understand it. On the other hand, if image data with a high image quality uniformly is reproduced on a cellular phone, etc., a large load is imposed on the device, which therefore may not be able to reproduce the image data smoothly or store the image data.

SUMMARY OF THE INVENTION

The present invention was made in view of the problems described above, and an object of the present invention is to provide an image converter, an image reproducer, an image conversion/reproduction system, and a program for enabling reproduction of image data that has a small overall image size as having been partially degraded but has had a desired data portion thereof upgraded to an image quality that is not beyond the capability of a reproducing device.

To achieve the above object, an image converter according to a first aspect of the present invention includes an image converting unit and a determining unit.

The image converting unit sequentially acquires frame image groups each including one or a plurality of frame image(s) from original image data that is constituted by these frame image groups, and outputs the frame image(s) included in each of the acquired frame image groups by converting an image quality of the frame image(s) based on a result of determination by the determining unit, thereby to generate a foreign-device-use image data that is constituted by the frame image groups including the frame image(s).

The determining unit determines whether it is necessary to retain the frame image(s) of each frame image group at a first image quality or not based on whether the frame image(s) of the frame image group satisfies/satisfy a predetermined condition or not.

In a case where the determining unit determines that it is necessary to retain the frame image(s) of the frame image group at the first image quality, the image converting unit outputs the frame image(s) of the frame image group at the first image quality.

In a case where the determining unit determines that it is unnecessary to retain the frame image(s) of the frame image group at the first image quality, the image converting unit outputs the frame image(s) of the frame image group at a second image quality.

The first image quality may be higher than the second image quality.

The first image quality may be equal to the image quality of the frame image(s) of each of the acquired frame image groups.

The determining unit may perform determination only on a frame image that is decodable without requiring other frames, of the frame image(s) included in each frame image group.

The determining unit may calculate a time interval between a reproduction start time of the frame image group that is currently the determination target and a reproduction start time of the most recent frame image group that has been determined as necessary to retain at the first image quality, and determine that it is unnecessary to retain the determination-target frame image group at the first image quality in a case where the time interval is shorter than a preset time period.

The determining unit may calculate the degree of image similarity between the frame image group that is currently the determination target and the most recent frame image group that has been determined as necessary to retain at the first image quality, and determine that it is unnecessary to retain the determination-target frame image group at the first image quality in a case where the degree of image similarity is equal to or greater than a preset value.

The determining unit may acquire the number of letters included in the frame image(s) of the frame image group that is currently the determination target, and determine that it is unnecessary to retain the frame image group at the first image quality in a case where the acquired number of letters is smaller than a preset number.

The image converter may further include an imaging unit that generates the original image data by imaging.

An image reproducer according to a second aspect of the present invention includes:

a reproducing unit that sequentially acquires frame image groups each including one or a plurality of frame images from image data that is constituted by these frame image groups, where a frame image group that is designated by a user is acquired first, and reproduces the image data;

a storage unit that temporarily stores at least one frame image of each of the frame image groups, in a case where the frame image group has a first image quality; and a zooming unit that suspends reproduction of the image data in response to an instruction of the user, and displays one or a plurality of frame image(s) that is/are temporarily stored by expanding or reducing the frame image(s).

An image conversion/reproduction system according to a third aspect of the present invention includes an image converter and an image reproducer.

The image converter includes an image converting unit and a determining unit.

The image converting unit sequentially acquires frame image groups each including one or a plurality of frame image(s) from original image data that is constituted by these frame image groups, and outputs the frame image(s) included in each of the acquired frame image groups by converting an image quality of the frame image(s) based on a result of determination by the determining unit, thereby to generate a foreign-device-use image data that is constituted by the frame image groups including the frame image(s).

The determining unit determines whether it is necessary to retain the frame image(s) of each frame image group at a first image quality or not based on whether the frame image(s) of the frame image group satisfies/satisfy a predetermined condition or not.

In a case where the determining unit determines that it is necessary to retain the frame image(s) of the frame image group at the first image quality, the image converting unit outputs the frame image(s) of the frame image group at the first image quality.

In a case where the determining unit determines that it is unnecessary to retain the frame image(s) of the frame image group at the first image quality, the image converting unit outputs the frame image(s) of the frame image group at a second image quality.

The image reproducer includes a reproducing unit, a storage unit, and a zooming unit.

The reproducing unit sequentially acquires the frame image groups from the foreign-device-use image data, where a frame image group that is designated by a user is acquired first, and reproduces the foreign-device-use image data.

The storage unit temporarily stores at least one frame image of each of the frame image groups, in a case where the frame image group has the first image quality.

The zooming unit suspends reproduction of the foreign-device-use image data in response to an instruction of the user, and displays one or a plurality of frame image(s) that is/are temporarily stored by expanding or reducing the frame image(s).

In a case where the determining unit determines any frame image group as necessary to retain at the first image quality, the image converting unit may arrange position information and a reproduction start time of a predetermined frame image of the frame image group to be stored in the storage unit, the image reproducer may include a list displaying unit that displays the frame image having the position information and the reproduction start time in the form of a list, and the user may designate any frame image that is displayed by the list displaying unit in the form of a list.

A recording medium according to a fourth aspect of the present invention stores a program that controls a computer to function as an image converter including an image converting unit and a determining unit, in a manner described below.

The image converting unit sequentially acquires frame image groups each including one or a plurality of frame image(s) from original image data that is constituted by these frame image groups, and outputs the frame image(s) included in each of the acquired frame image groups by converting an image quality of the frame image(s) based on a result of determination by the determining unit, thereby to generate a foreign-device-use image data that is constituted by the frame image groups including the frame image(s).

The determining unit determines whether it is necessary to retain the frame image(s) of each frame image group at a first image quality or not based on whether the frame image(s) of the frame image group satisfies/satisfy a predetermined condition or not.

In a case where the determining unit determines that it is necessary to retain the frame image(s) of the frame image group at the first image quality, the image converting unit outputs the frame image(s) of the frame image group at the first image quality.

In a case where the determining unit determines that it is unnecessary to retain the frame image(s) of the frame image group at the first image quality, the image converting unit outputs the frame image(s) of the frame image group at a second image quality.

A recording medium according to a fifth aspect of the present invention stores a program that controls a computer to function as:

a reproducing unit that sequentially acquires frame image groups each including one or a plurality of frame images from image data that is constituted by these frame image groups, where a frame image group that is designated by a user is acquired first, and reproduces the image data;

a storage unit that temporarily stores at least one frame image of each of the frame image groups, in a case where the frame image group has a first image quality; and a zooming unit that suspends reproduction of the image data in response to an instruction of the user, and displays one or a plurality of frame image(s) that is/are temporarily stored by expanding or reducing the frame image(s).

Effect of the Invention

In accordance with the present invention, it is possible to reduce the overall size of image data by degrading a portion of the image data to a lower image quality while upgrading a different portion of the image data to a higher image quality or keeping it as it is, enabling that portion of the image data to be viewed at a high image quality or to be expanded.

BRIEF DESCRIPTION OF THE DRAWINGS

These objects and other objects and advantages of the present invention will become more apparent upon reading of the following detailed description and the accompanying drawings in which:

FIG. 7 is a diagram showing an example of a high resolution scene managing table;

FIG. 14 is a diagram showing a modification (part 2) of the structure of the mobile-device-use image data;

FIG. 15A is a diagram showing a modification of the high resolution scene managing table corresponding to the mobile-device-use image data of FIG. 13; and FIG. 15B is a diagram showing a modification of the high resolution scene managing table corresponding to the mobile-device-use image data of FIG. 14.

DETAILED DESCRIPTION OF THE PREFERRED EMBODIMENT

Figure 1:
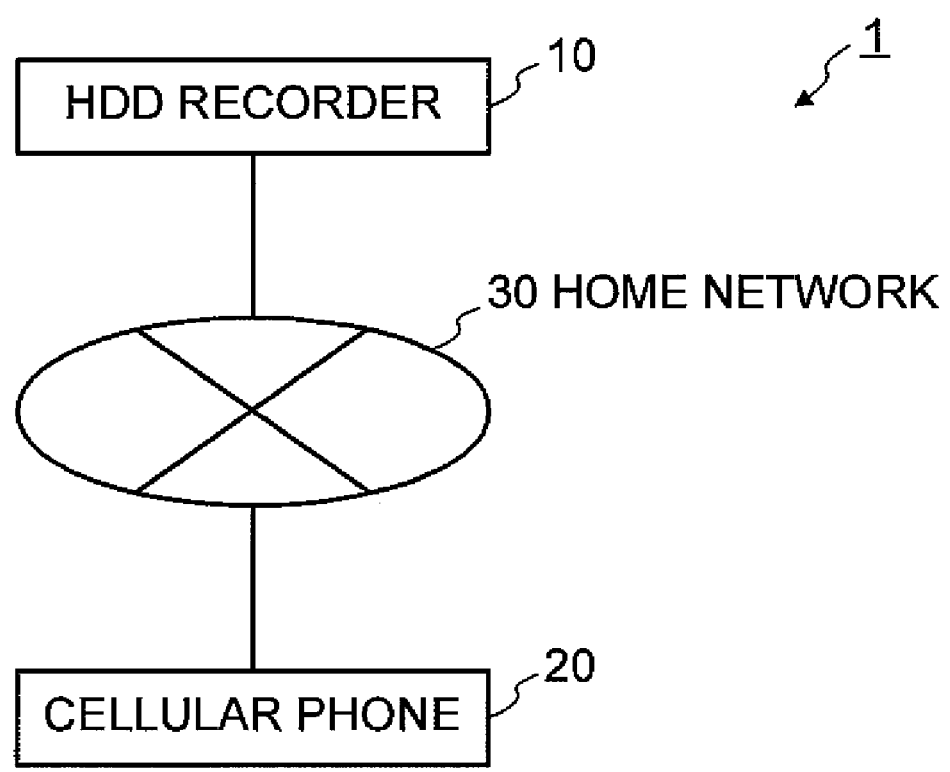
FIG. 1 is a diagram showing the configuration of an image conversion/reproduction system according to one embodiment of the present invention.

An image conversion/reproduction system according to one embodiment of the present invention will be explained with reference to the drawings. As shown in FIG. 1, an image conversion/reproduction system 1 according to the present embodiment includes a HDD recorder 10 as one embodiment of an image converter and a cellular phone 20 as one embodiment of an image reproducer. The HDD recorder 10 and the cellular phone 20 can exchange data via a home network 30. The home network 30 is constituted by, for example, a wireless LAN.

Figure 2:
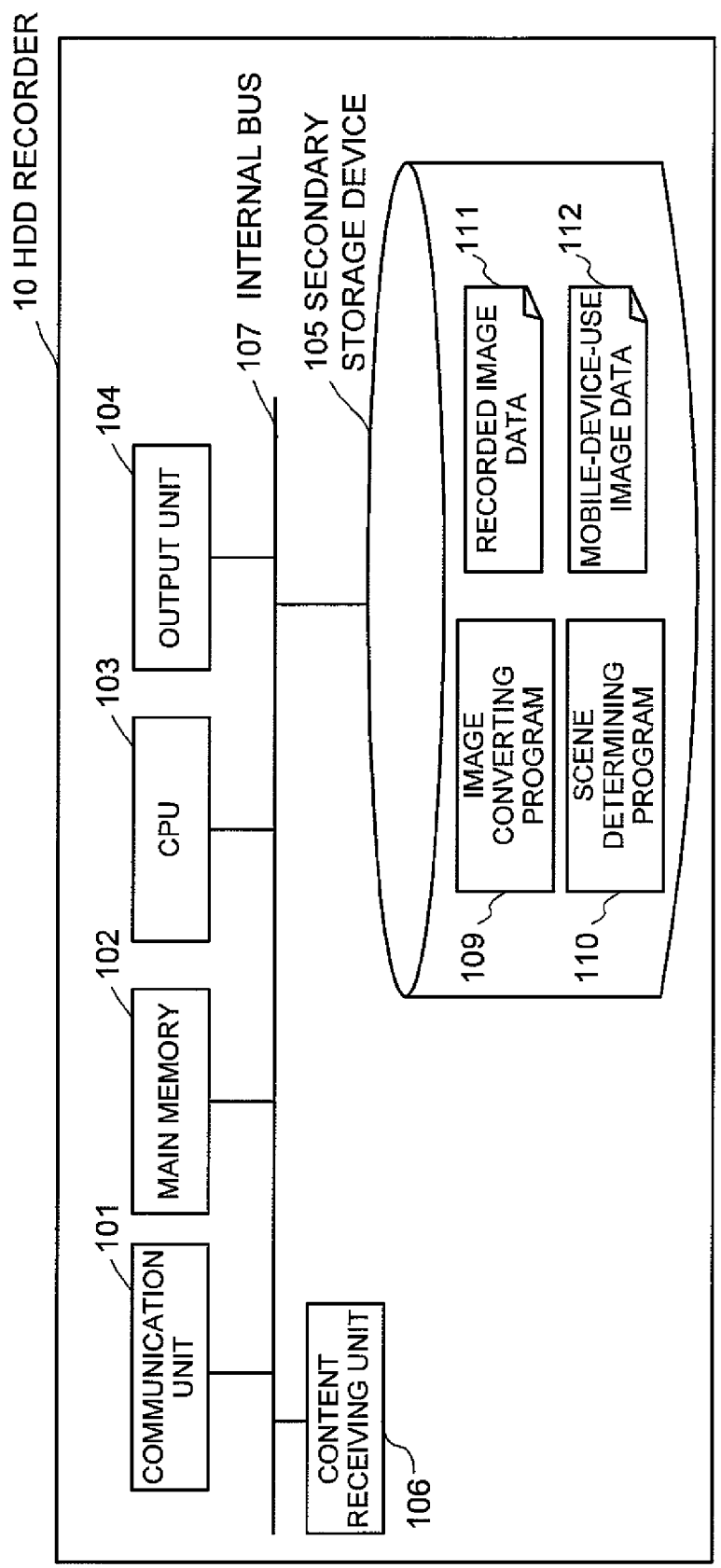
FIG. 2 is a block diagram showing the configuration of a HDD recorder of FIG. 1.

As shown in FIG. 2, the HDD recorder 10 includes a communication unit 101 comprising a network card or the like, a main memory 102, a CPU 103, an output unit 104, a secondary storage device 105, and a content receiving unit 106. These components are connected to an internal bus 107.

The secondary storage device 105 stores an image converting program 109 and a scene determining program 110. These programs will be loaded onto the main memory 102 as needed. The CPU 103 operates in accordance with these programs and performs an image data converting process and a scene determining process, which are to be described later. The secondary storage device 105 stores image data (e.g., content data compliant with a digital terrestrial broadcasting standard) received by the content receiving unit 106 as recorded image data 111. The secondary storage device 105 also stores image data obtained by converting the recorded image data 111 for use by the cellular phone 20 as mobile-device-use image data 112. In the present embodiment, the recorded image data 111 and the mobile-device-use image data 112 are both moving image data in MPEG2 format.

The recorded image data 111 is output via the output unit 104 to a TV monitor or the like unillustrated and reproduced thereon. In the present embodiment, the TV monitor or the like has a screen resolution of 1920×1080 dots. Correspondingly, the recorded image data 111 has a resolution of 1920×1080 dots.

Figure 3:
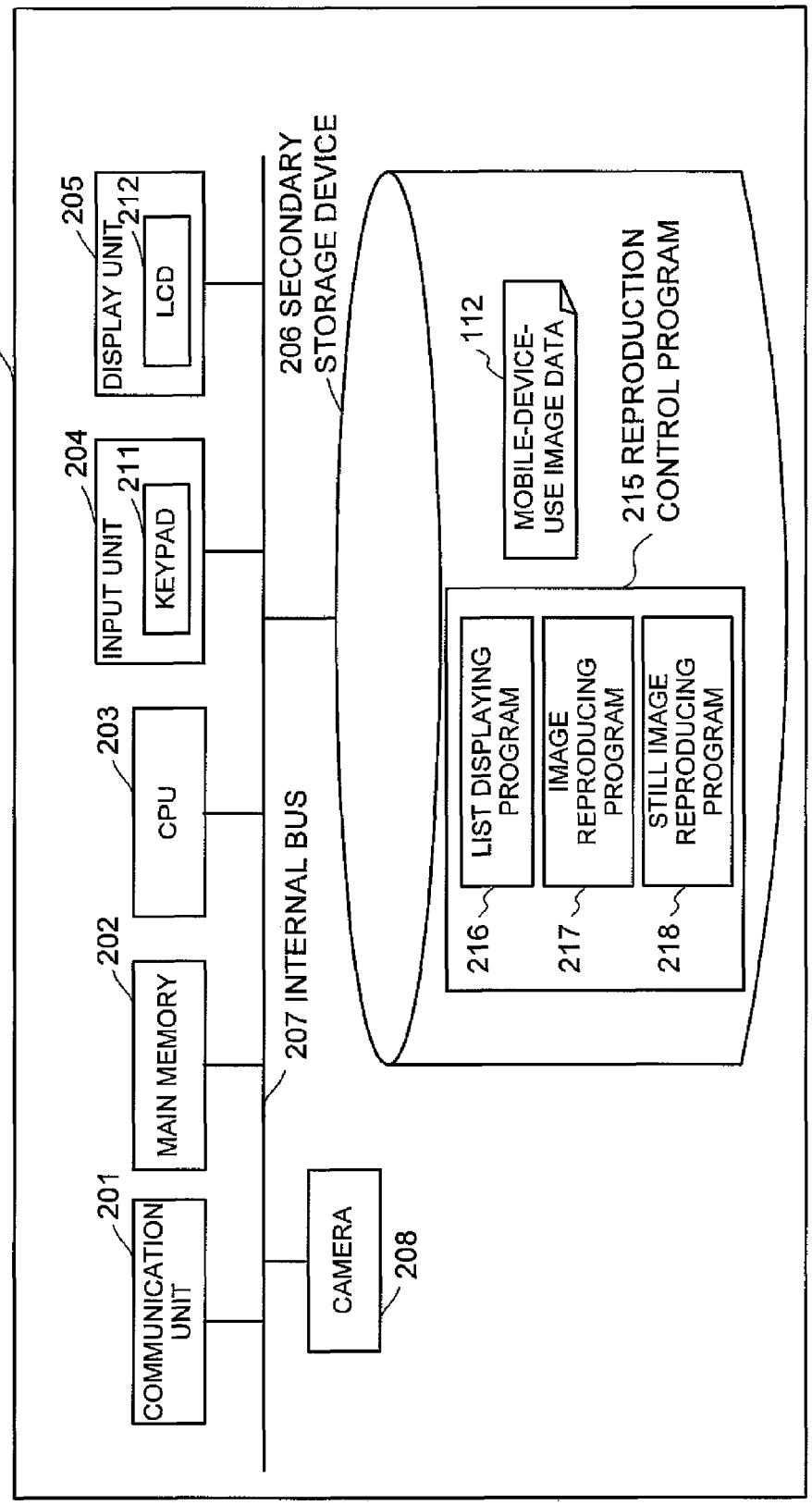
FIG. 3 is a block diagram showing the configuration of a cellular phone of FIG. 1.

As shown in FIG. 3, the cellular phone 20 includes a communication unit 201 comprising a network card or the like, a main memory 202, a CPU 203, an input unit 204, a display unit 205, and a secondary storage device 206. These components are connected to an internal bus 207.

The input unit 204 is constituted by a keypad 211 or the like, and receives an input from a user. The display unit 205 is constituted by a liquid crystal display (LCD) 212 or the like, and displays, for example, an image based on the mobile-device-use image data 112 in accordance with an instruction from the CPU 203. The LCD 212 has a screen resolution of 600×480 dots.

The secondary storage device 206 stores a list displaying program 216, an image reproducing program 217, and a still image reproducing program 218, as a reproduction control program 215. These programs will be loaded onto the main memory 202 as needed. The CPU 203 operates in accordance with these programs and performs a reproduction control process, which is to be described later. The secondary storage device 206 stores the mobile-device-use image data 112 received from the HDD recorder 10 via the home network 30.

Figure 4:
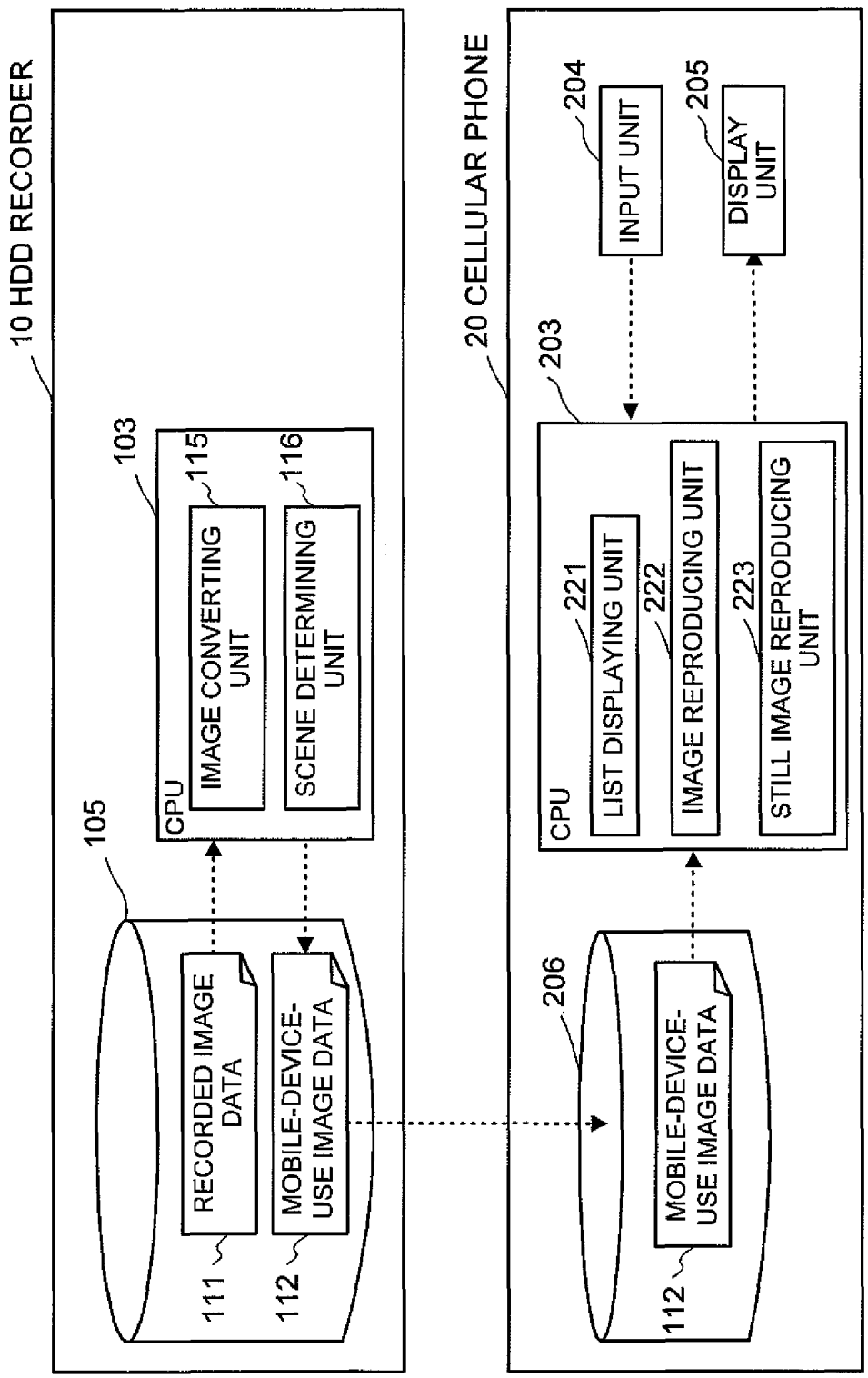
FIG. 4 is a diagram conceptually showing an operation of the image conversion/reproduction system of FIG. 1.

FIG. 4 is a diagram that conceptually shows the operation of the image conversion/reproduction system 1 according to the present embodiment. The HDD recorder 10 performs the image data converting process to generate the mobile-device-use image data 112 based on the recorded image data 111. Specifically, an image converting unit 115 and a scene determining unit 116, which are functional units of the CPU 103, perform the image data converting process.

The cellular phone 20 sends a command (image data request command) for requesting the mobile-device-use image data 112 to the HDD recorder 10 via the home network 30, in response to an operation of the user. The HDD recorder 10 receives the image data request command, reads out the mobile-device-use image data 112 stored in the secondary storage device 105, and sends it to the cellular phone 20 via the home network 30. The cellular phone 20 stores the received mobile-device-use image data 112 in the secondary storage device 206.

The cellular phone 20 performs the reproduction control process, which is to be described later, in response to an operation of the user. The reproduction control process includes a list displaying process, an image reproducing process, and a zooming process. Specifically, a list displaying unit 221, an image reproducing unit 222, and a still image reproducing unit 223, which are functional units of the CPU 203, perform the list displaying process, the image reproducing process, and the zooming process.

The above-mentioned process performed by the HDD recorder 10 and the cellular phone 20 will now be explained in detail. First, the image data converting process performed by the HDD recorder 10 will be explained.

Figure 5:
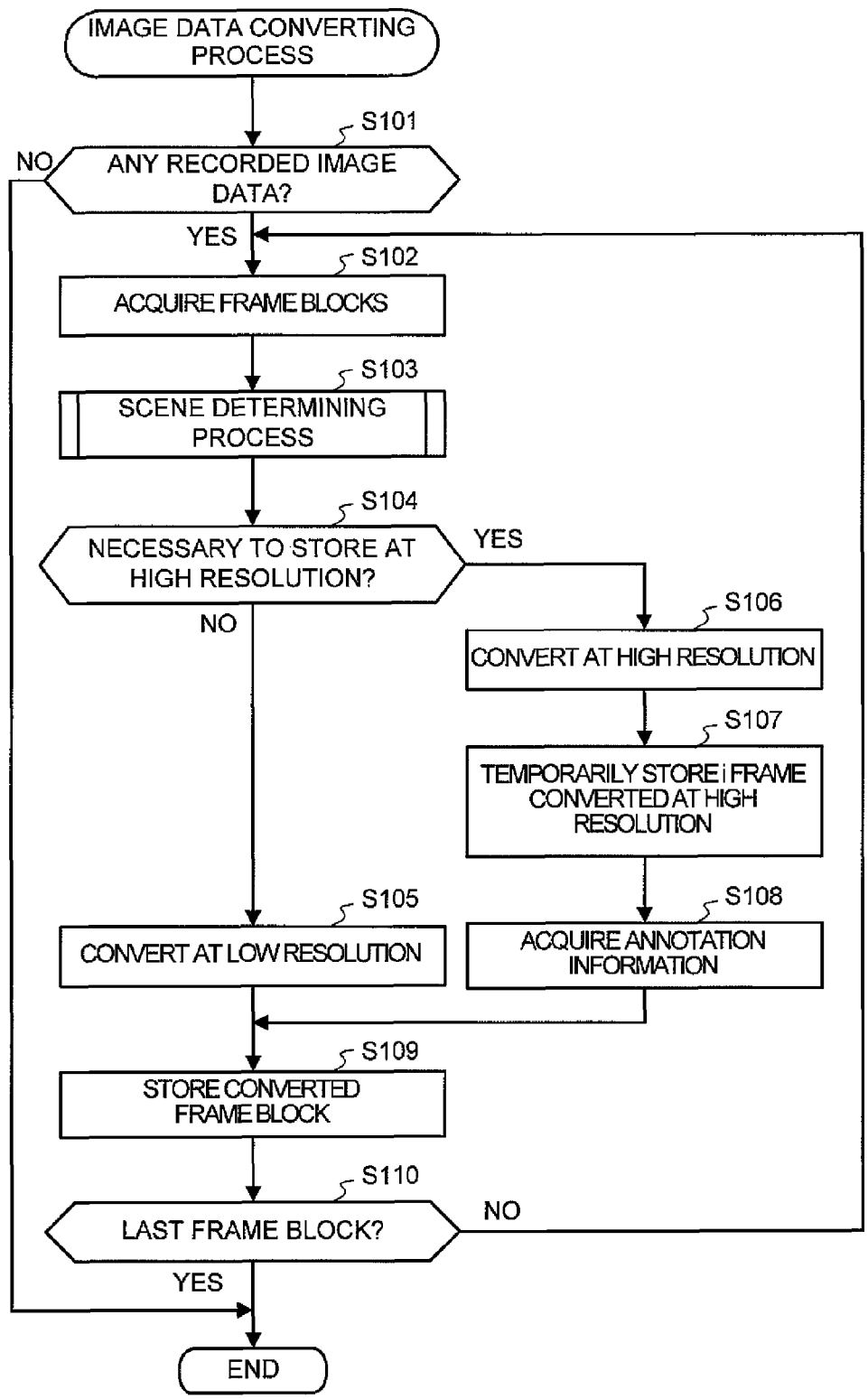
FIG. 5 is a flowchart showing the procedures of an image data converting process.

FIG. 5 is a flowchart showing the procedures of the image data converting process. In the present embodiment, the image converting unit 115 of the CPU 103 starts up in response to an operation of the user (including a command from the cellular phone 20), and performs the image data converting process described below. The image converting unit 115 may start up at an arbitrary timing and be designed to start up regularly (at regular intervals).

First, the image converting unit 115 determines whether any recorded image data 111 is stored in the secondary storage device 105 or not (step S101). In a case where no recorded image data 111 is stored in the secondary storage device 105 (step S101; NO), the image data converting process terminates here. In a case where any recorded image data 111 is stored in the secondary storage device 105 (step S101; YES), the image converting unit 115 sequentially acquires the image frames (frame blocks 601 shown in FIG. 6A) that constitute the recorded image data 111 (step S102).

Figure 6A:
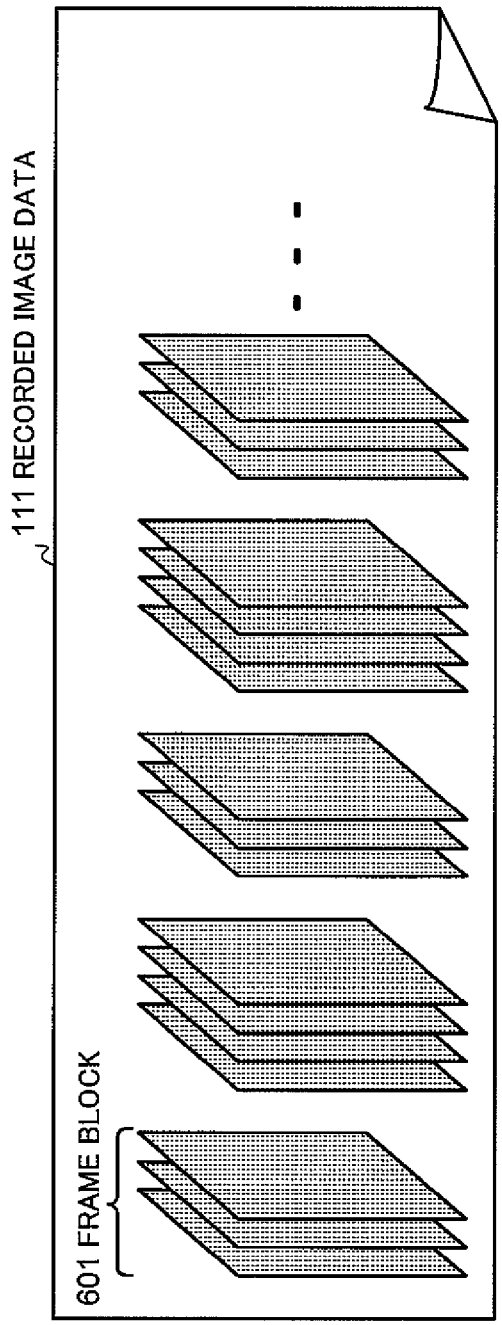
FIG. 6A is a diagram showing the structure of recorded image data.

Frame blocks to be sequentially acquired by the image converting unit 115 will now be explained. Each of the frame blocks 601 shown in FIG. 6A is a group of frames that are organized together based on significance to each other, out of all the frames that constitute the image data. The frame blocks 601 are equivalent to, for example, Groups of Pictures (GOP) in MPEG2. In compression coding, frames to be organized into any frame block 601 will be compressed without having any dependency on frames to be organized into other frame blocks 601. That is, in reproducing images, the frames can be decoded within their own frame block 601. The resolution needs only to be uniform within each frame block 601; different frame blocks 601 may have different resolutions.

It is likely that the recorded image data 111 includes a frame block 601 that requires a very long time period for reproduction. To deal with such a case, the image converting unit 115 may check the reproduction time period required by each frame block 601 of the recorded image data 111 before acquiring the first frame block 601 to determine whether or not there is any frame block 601 that requires equal to or longer than a preset time period. In a case where there is any frame block 601 that requires equal to or longer than the preset time period, the image converting unit 115 may divide the frame block 601 requiring equal to or longer than the preset time period into two or more new frame blocks 601 to generate new recorded image data 111. The image converting unit 115 may generate the mobile-device-use image data 112 based on the new data.

Returning to the flowchart of FIG. 5, the scene determining unit 116 performs the scene determining process on the frame blocks acquired by the image converting unit 115 (step S103). The scene determining unit 116 determines whether or not each acquired frame block 601 needs to be stored at a high resolution (the resolution of 1920×1080 dots in the present embodiment). The scene determining process performed by the scene determining unit 116 will be described in detail later.

In a case where the scene determining unit 116 determines a given frame block as necessary to store at a high resolution (step S104; YES), the image converting unit 115 converts that frame block 601 at a high resolution (step S106). Note that the recorded image data 111 has been already stored at a so-defined high resolution of the present embodiment (the resolution of 1920×1080 dots). Therefore, in the present embodiment, this frame block 601 will not have its resolution changed through the conversion.

The image converting unit 115 extracts an i frame from the frame block 601 converted at a high resolution, and temporarily stores it in the secondary storage device 105 (step S107). The i frame stored here will be used in the scene determining process. An i frame is a frame that has been compressed within itself (equivalent to, e.g., i (intra) frame in MPEG2). In the present embodiment, it is assumed that the first frame of each frame block 601 is an i frame.

Figure 6B:
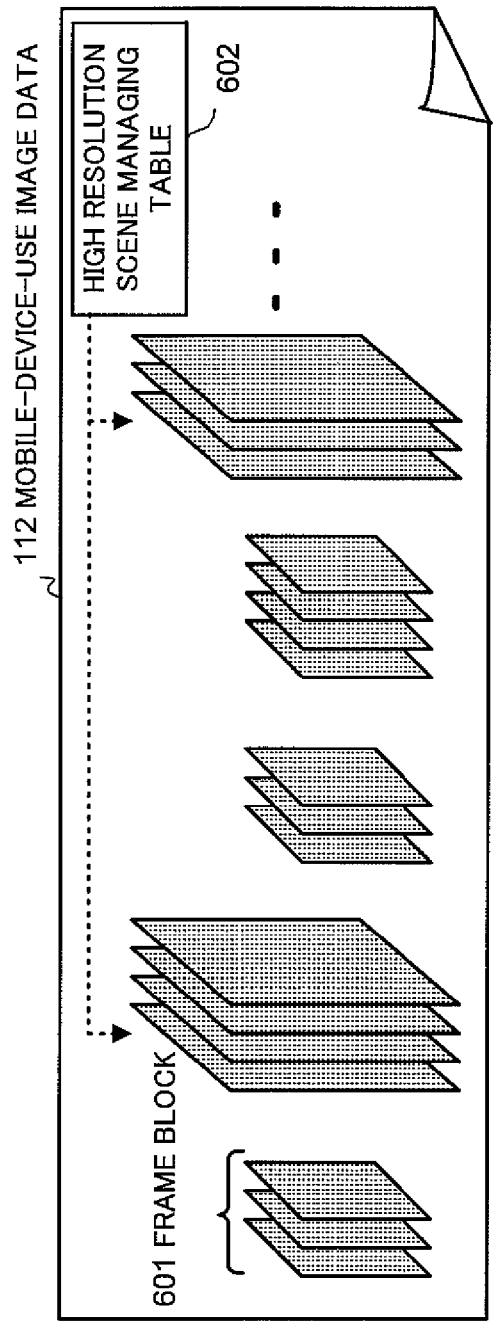
FIG. 6B is a diagram showing the structure of mobile-device-use image data.

The image converting unit 115 registers annotation information (frame number and reproduction start time) that is related to the frame block 601 that has been converted at a high resolution in a high resolution scene managing table 602 shown in FIG. 6B (step S108). The high resolution scene managing table 602 is stored in a predetermined area of the mobile-device-use image data 112. As shown in FIG. 7, the high resolution scene managing table 602 has a field for "frame number" and a field for "reproduction start time". The image converting unit 115 sets the number of the first frame (i.e., i frame) of that frame block 601 (the number being a numeral that indicates the order of that first frame in the recorded image data 111) in the frame number field, and the reproduction start time of that frame block 601 in the reproduction start time field. As will be described in detail later, the high resolution scene managing table 602 will be used for allowing the cellular phone 20 to reproduce the mobile-device-use image data 112 by cue playback of the frame block 601 converted at a high resolution.

Returning to the flowchart of FIG. 5, in a case where the scene determining unit 116 determines a given frame block as unnecessary to store at a high resolution (step S104; NO), the image converting unit 115 converts that frame block to a low resolution (the resolution of 600×480 dots in the present embodiment) (step S105).

The image converting unit 115 stores the frame blocks 601 that have been converted either at a high resolution or to a low resolution in the secondary storage device 105 as frame blocks 601 that constitute the mobile-device-use image data 112 (step S109). The image converting unit 115 determines whether a frame block 601 extracted from the recorded image data 111 is the last frame block or not (step S110). In a case where a frame block 601 extracted from the recorded image data 111 is not the last frame block (step S110; NO), the flow returns to step S102 to repeat the process described above. On the other hand, in a case where a frame block 601 extracted from the recorded image data 111 is the last frame block (step S110; YES), the image data converting process ends. The mobile-device-use image data 112 is obtained through the above-described image data converting process.

Figure 8:
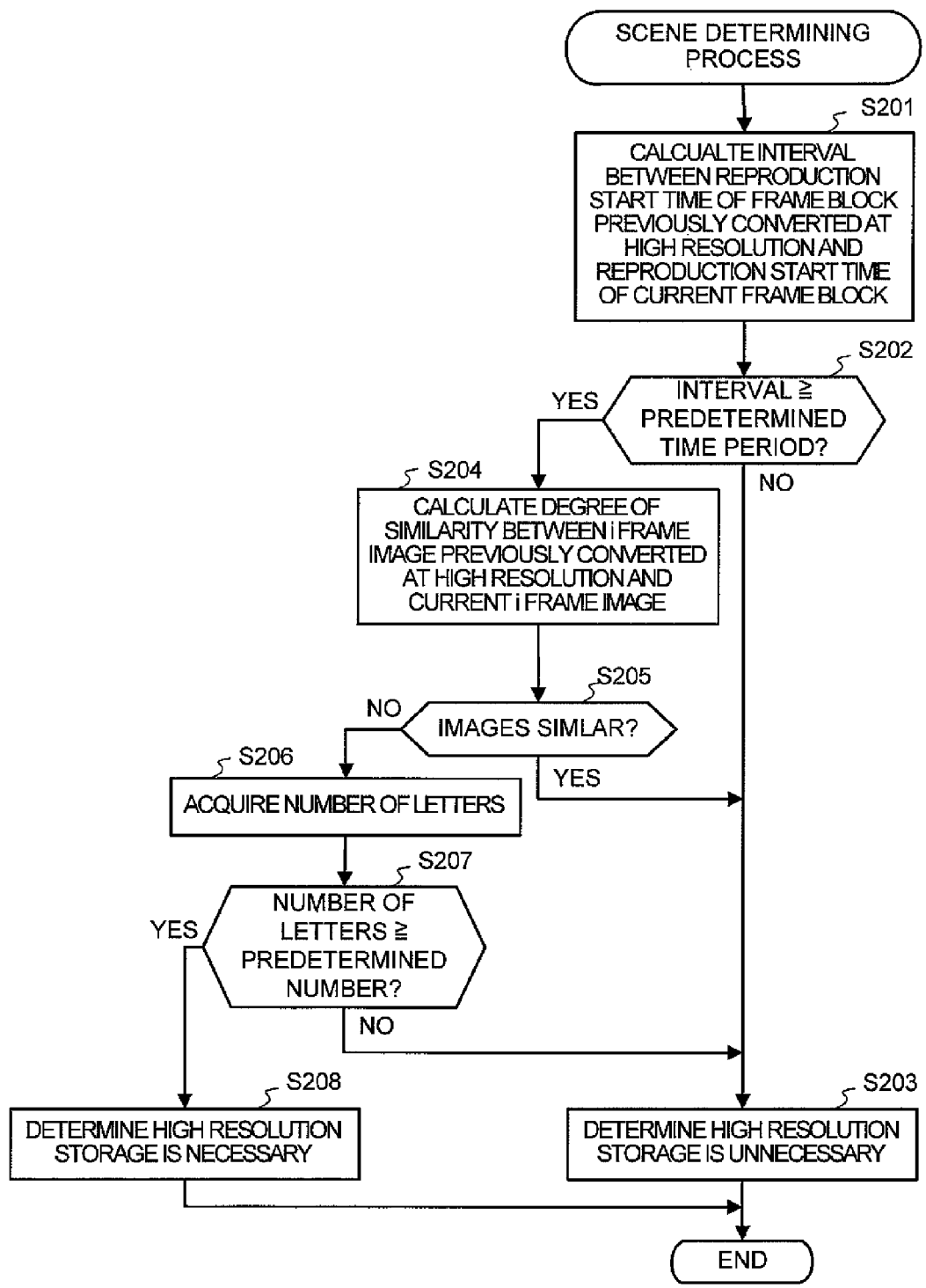
FIG. 8 is a flowchart showing the procedures of a scene determining process.

The scene determining process will now be explained in detail with reference to the flowchart of FIG. 8. First, the scene determining unit 116 acquires the reproduction start time of the frame block 601 that is currently the conversion target and that of the most recent frame block 601 that has been converted at a high resolution, and calculates the time interval between these reproduction start times (step S201). In a case where the calculated interval is shorter than a preset time period (step S202; NO), the scene determining unit 116 determines that the conversion target frame block 601 needs not be stored at a high resolution (step S203). This can prevent the mobile-device-use image data 112 from being large-sized.

On the other hand, in a case where the interval between them is equal to or longer than the present time period (step S202; YES), the scene determining unit 116 reads out the i frame of the most recent frame block 601 that has been converted at a high resolution, and calculates the degree of similarity between the i frame image of the conversion target frame block 601 and the i frame image of the most recent frame block 601 converted at a high resolution (step S204). The present embodiment is not limited in how to calculate the degree of similarity and can employ a known technique.

The scene determining unit 116 compares the calculated degree of similarity with a preset threshold to determine whether the i frame images are similar or not (step S205). In a case where the i frames are similar (step S205; YES), the scene determining unit 116 determines that the conversion target frame block 601 needs not be stored at a high resolution (step S203). Generally, in a situation where frames of information that are displayed continuously are similar, i.e., a situation where images do not change greatly from scene to scene, it can be determined that such images need not be displayed at a high resolution. Therefore, it is possible to prevent unnecessary increase of the size of the mobile-device-use image data 112, by avoiding a high resolution storing in such a case.

On the other hand, in a case where the i frame images are not similar (step S205; NO), the scene determining unit 116 acquires the number of letters included in the i frame image converted at a high resolution by a know technique (step S206). In a case where the acquired number of letters is smaller than a preset number (step S207; NO), the scene determining unit 116 determines that the conversion target frame block 601 needs not be stored at a high resolution (step S203). On the other hand, in a case where the acquired number of letters is equal to or greater than the preset number (step S207; YES), the scene determining unit 116 determines that the conversion target frame block 601 needs to be stored at a high resolution (step S208). As a result, when a user reproduces, for example, an image that contains small letters to be displayed closely on the cellular phone 20, he/she can zoom it up so he/she can see it well.

In the scene determining process described above, the scene determining unit 116 determines that a frame block needs to be stored at a high resolution in a case where three conditions, namely the interval between reproduction start times, the degree of similarity between images, and the number of letters included in an image are all satisfied. However, this is one example, and it may be determined that a frame block needs to be stored at a high resolution in a case where any one or more of these conditions is/are satisfied. In a case where more than one conditions are used in combination, they need not be used in a specific order. For example, the degree of similarity may be checked first. Then, if the images are not similar, the number of letters may be checked. If the number of letters is equal to or greater than the preset number, the interval may then be checked. If the interval is equal to or longer than the preset time period, the conversion target frame block may be determined as necessary to store at a high resolution.

Figure 9:
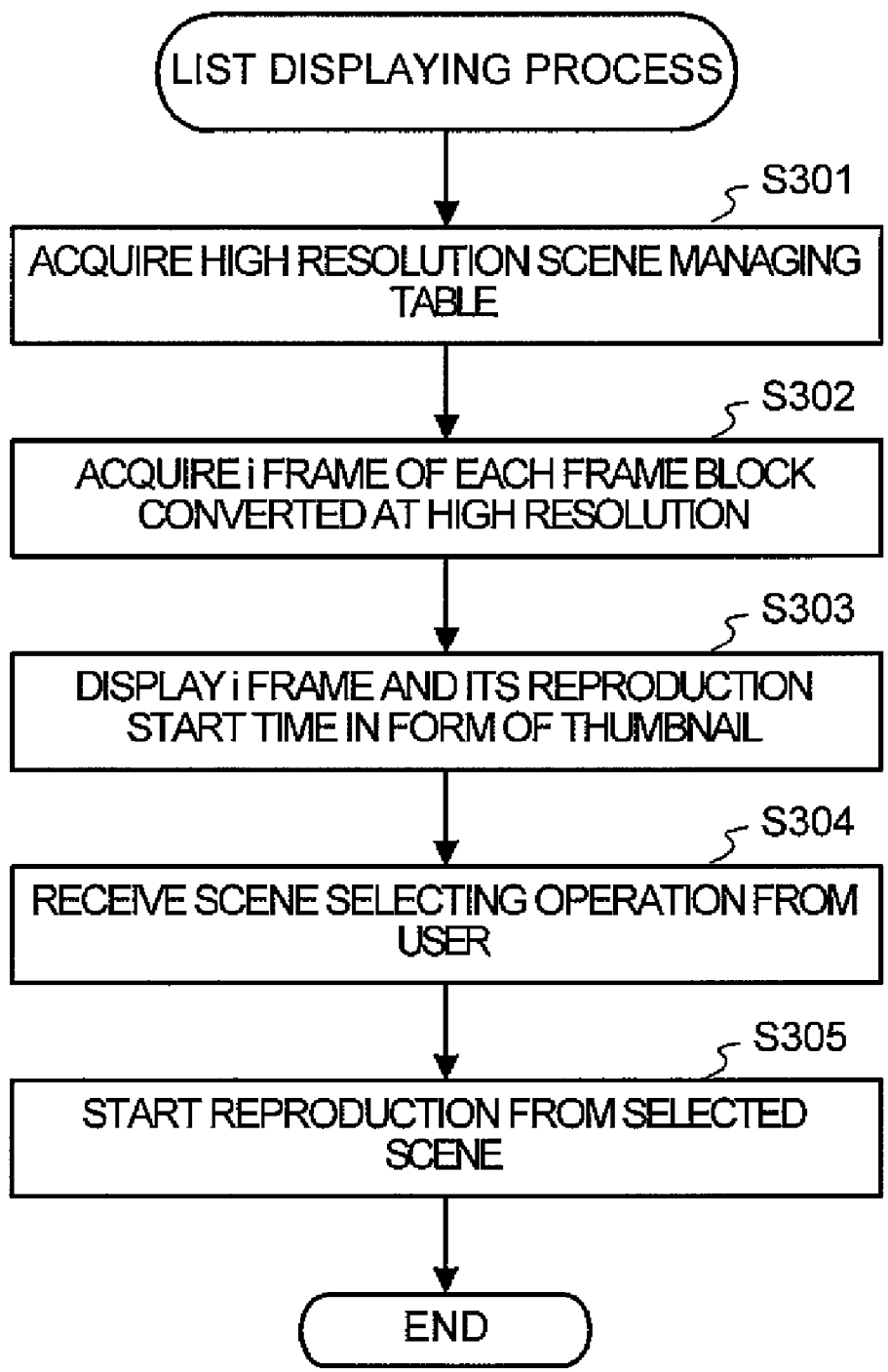
FIG. 9 is a flowchart showing the procedures of a list displaying process.

The operation of the cellular phone 20 for reproducing the mobile-device-use image data 112 will now be explained. First, the list displaying process performed by the list displaying unit 221 will be explained with reference to the flowchart of FIG. 9. The list displaying unit 221 starts in response to a user's operation via the keypad 211, and performs the list displaying process described below.

The list displaying unit 221 reads out the high resolution scene managing table 602 from the mobile-device-use image data 112 stored in the secondary storage device 206 (step S301). The list displaying unit 221 acquires the frames (i frames) corresponding to the frame numbers set in the frame number field of the high resolution scene managing table 602 (step S302). The list displaying unit 221 displays images (scenes), which are the respective i frame images affixed with their own reproduction start time, on the display unit 205 in the form of thumbnails (step S303). After displaying the thumbnails, the list displaying unit 221 enters into a state ready to receive a selection operation of the user (a selection operation awaiting state) (step S304). The user can select a desired scene by operating the keypad 211 to use for example, a cursor moving key and move the cursor from scene to scene.

When the user selects a scene and presses an enter key or the like of the keypad 211, the list displaying unit 221 notifies the user's selection to the image reproducing unit 222. The image reproducing unit 222 starts to reproduce the image data from the frame block 601 corresponding to the selected scene (step S305).

Figure 10:
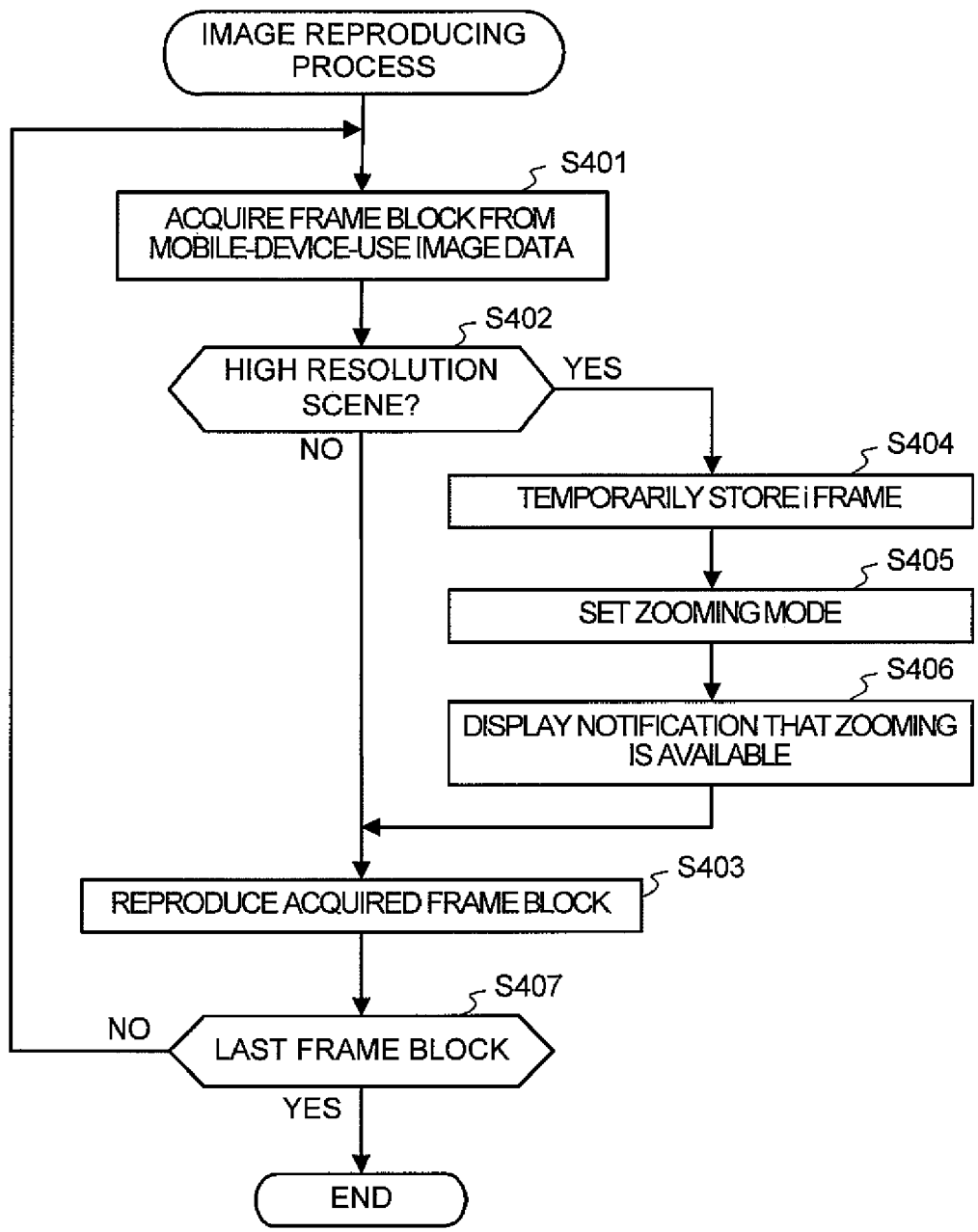
FIG. 10 is a flowchart showing the procedures of an image reproducing process.

The image reproducing process performed by the image reproducing unit 222 will now be explained with reference to the flowchart of FIG. 10. The image reproducing unit 222 sequentially acquires frame blocks 601 from the mobile-device-use image data 112 (step S401). In a case where, as described above, the image reproducing unit 222 reproduces image data from the scene selected by the user, the image reproducing unit 222 sequentially acquires frame blocks 601 from the frame block 601 corresponding to the selected scene.

Next, the image reproducing unit 222 determines whether or not each frame block 601 is a high resolution scene (step S402). The image reproducing unit 222 makes this determination by determining whether the scene is higher than a predetermined resolution (in the present embodiment, 640× 480 dots) or not. Needless to say, in a case where reproduction starts from the scene selected by the user, the frame block 601 acquired first is a high resolution scene.

Figure 11C:
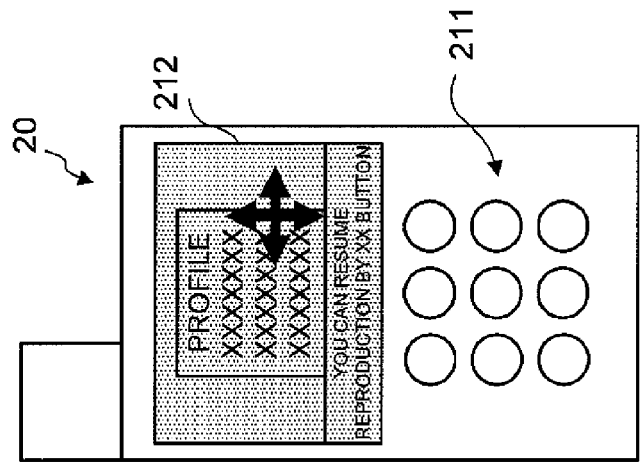
FIG. 11C is a diagram showing an example of the output screen when an image is zoomed up in the reproduction control process.
Figure 11B:
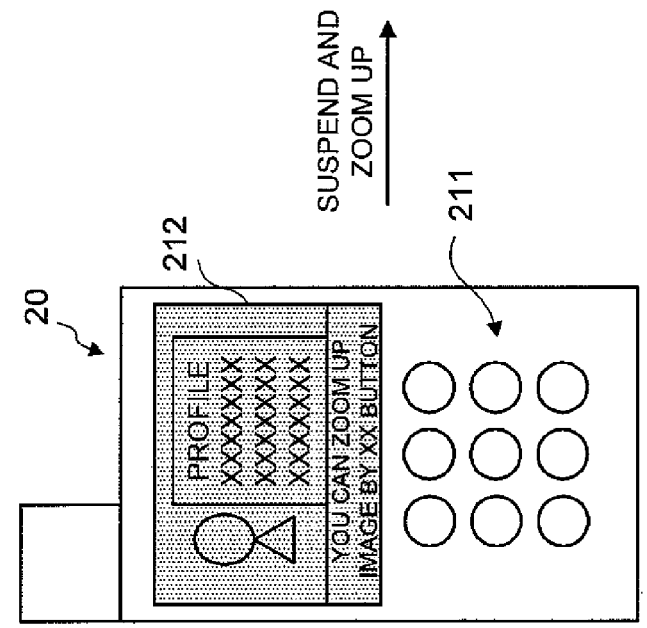
FIG. 11B is a diagram showing an example of the output screen in a zooming mode in the reproduction control process.
Figure 11A:
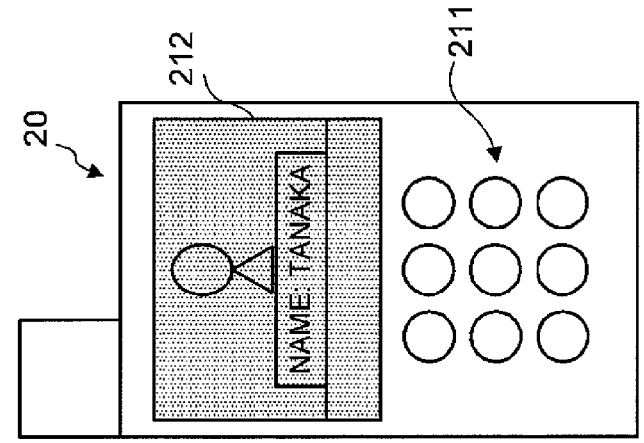
FIG. 11A is a diagram showing an example of an output screen when an image is reproduced normally in a reproduction control process.

In a case where the frame block 601 is not a high resolution scene (step S402; NO), the image reproducing unit 222 goes to step S403 and reproduces this frame block 601 (see FIG. 11A). On the other hand, in a case where the frame block 601 is a high resolution scene (step S402; YES), the image reproducing unit 222 goes to step S403 after performing steps S404 to S406.

At step S404, the image reproducing unit 222 extracts the first frame (i.e., i frame) of the frame block 601 and temporarily stores the extracted first frame in the secondary storage device 206 as image data to be zoomed. At step S405, the image reproducing unit 222 sets a zooming mode as the control mode of the cellular phone 20. When the zooming mode is set as the control mode, the still image reproducing unit 223, which is to be described later, starts. At step S406, the image reproducing unit 222 displays a message that informs the user that zooming is available with a press of a predetermined key of the keypad 211 (e.g., "you can zoom up the image by the XX button") on the LCD 212 (see FIG. 11B).

The zooming mode set here is automatically reset when a predetermined time period has passed. When the zooming mode is reset, the process (zooming process) performed by the still image reproducing unit 223 ends and the message is deleted (or hidden).

The zooming mode may be designed not to be reset while similar scenes are reproduced. Alternatively, the zooming mode may be designed not to be reset until the image reproducing process ends once it is set.

The image reproducing unit 222 repeatedly performs the above-described process until it reproduces the last frame block 601 (step S407; YES), or until the user gives an operation to stop reproduction.

Figure 12:
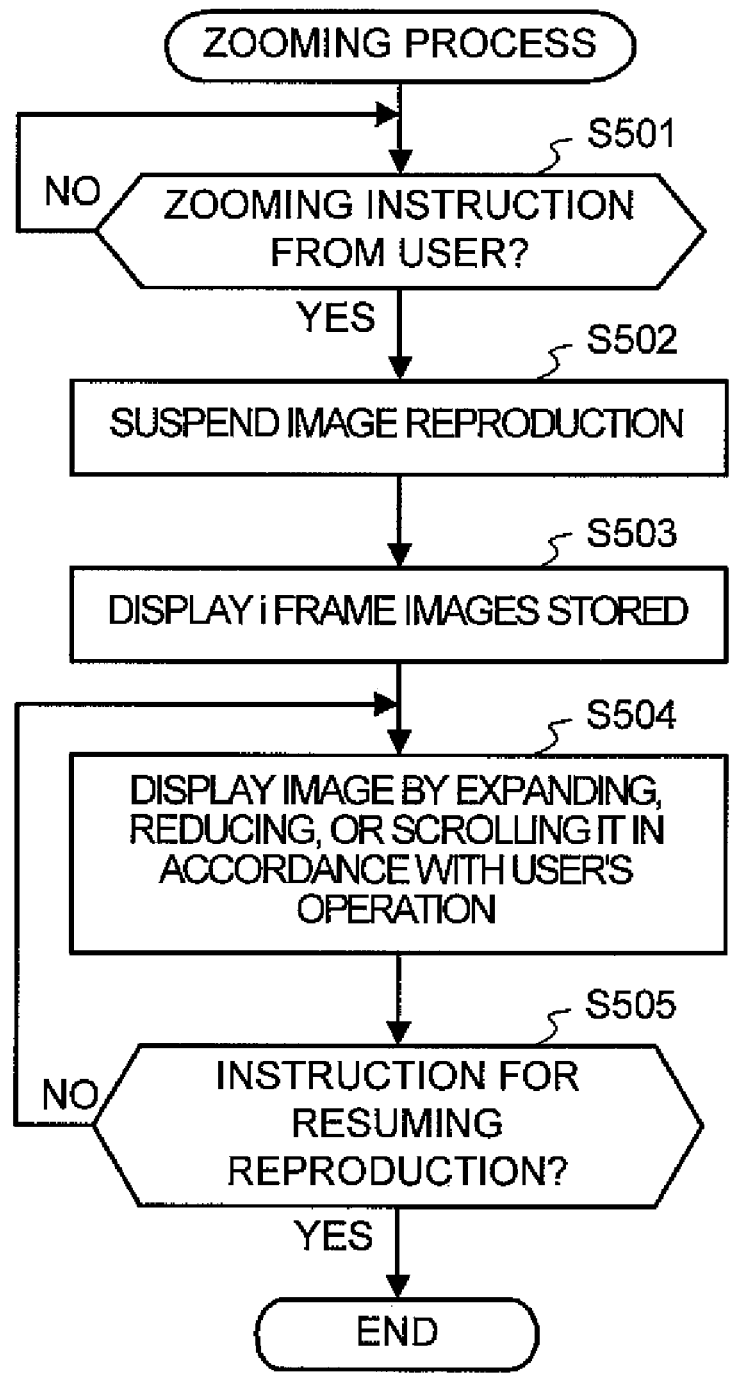
FIG. 12 is a flowchart showing the procedures of a zooming process.

The zooming process performed by the still image reproducing unit 223 will be explained with reference to the flowchart of FIG. 12. When the user presses a predetermined key of the keypad 211 while in the zooming mode to enter a zooming instruction (step S501; YES), the still image reproducing unit 223 makes the image reproducing unit 222 suspend the image reproducing process (step S502). The still image reproducing unit 223 acquires the i frame stored in the secondary storage device 206 (see step S404 of FIG. 10), and displays the image of that i frame (i frame image) on the display unit 205 (step S503). The still image reproducing unit 223 displays a message that notifies the user that reproduction will be resumed with a press of a predetermined key of the keypad 211 (e.g., "you can resume reproduction by the XX button") on the LCD 212 (see FIG. 11C).

The still image reproducing unit 223 performs expansion, reduction, scrolling, etc. of the i frame image in accordance with an operation instruction of the user given via the keypad 211 or the like (step S504). These processes will be continued until the user enters an instruction for resuming reproduction (step S505; YES).

As explained above, the HDD recorder 10 (image converter) according to the present embodiment generates the mobile-device-use image data 112 for the cellular phone 20 from the recorded image data 111 recorded at a high resolution by performing the scene determining process to determine whether or not it is necessary to store each frame block 601 at a high resolution, taking into account various conditions. The HDD recorder 10 stores any frame block 601 that is determined to be necessary to store at a high resolution in the mobile-device-use image data 112 without degrading it. Therefore, the HDD recorder 10 according to the present embodiment can generate the mobile-device-use image data 112 that includes high-resolution scenes without increasing the data size.

The cellular phone 20 (image reproducer) according to the present embodiment can display an i frame image of a frame block that is stored at a high resolution by appropriately performing expansion, etc. of the image in accordance with an instruction of the user. Hence, the user can enjoy the merit of high quality images even when the reproducing device is the cellular phone 20.

The present invention is not limited to the embodiment described above, but various modifications are available within the scope of the spirit of the present invention.

For example, in the embodiment described above, the image converting unit 115 of the HDD recorder 10 (image converter) generates the mobile-device-use image data 112 by reducing the resolution of the recorded image data 111. However, the image quality parameter to be converted is not limited to resolution. For example, the parameter may be codec, bit rate, etc.

In the embodiment described above, the high resolution scene managing table 602 is embedded in the mobile-device-use image data 112. However, the high resolution scene managing table 602 may be generated by the HDD recorder 10 (image converter) separately from the mobile-device-use image data 112 and stored in the secondary storage device 105. In this case, the cellular phone 20 (image reproducer) acquires the high resolution scene managing table 602 together when acquiring the mobile-device-use image data 112 from the HDD recorder 10.

Figure 13:
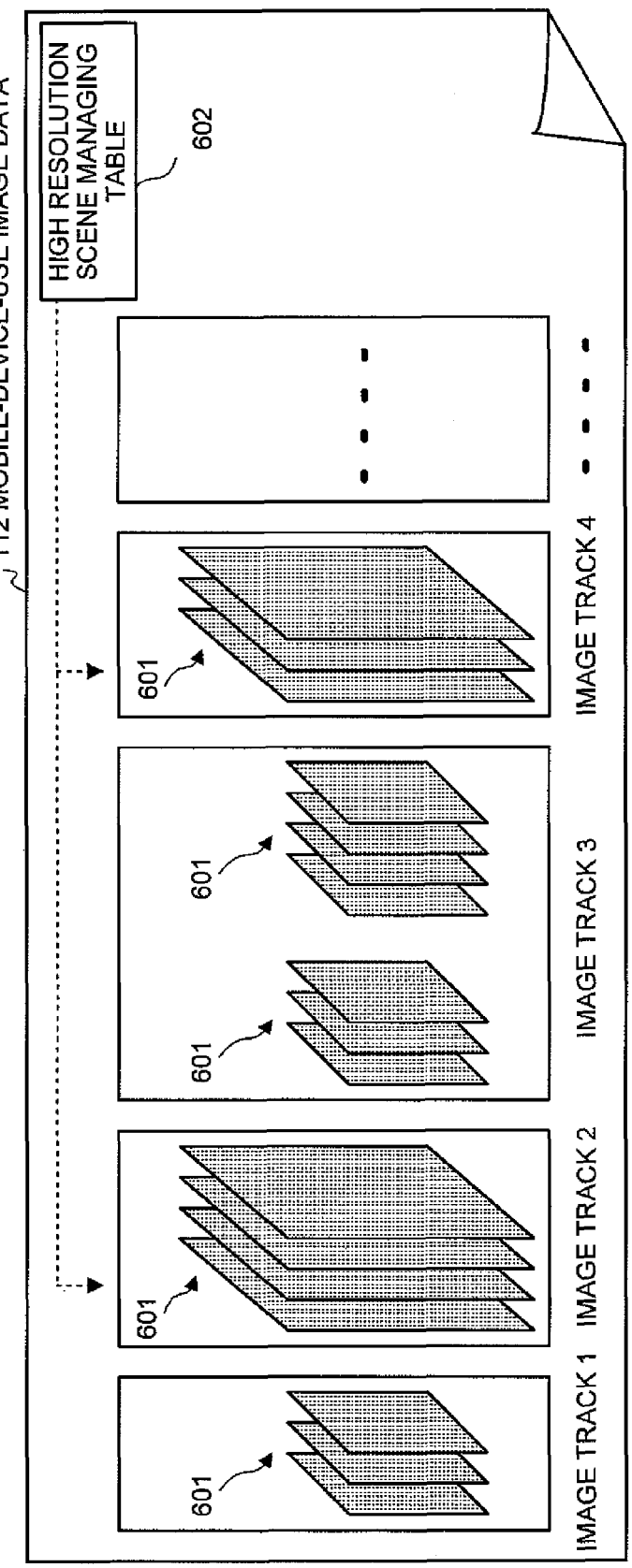
FIG. 13 is a diagram showing a modification (part 1) of the structure of the mobile-device-use image data.

As shown in FIG. 13, the image converting unit 115 of the HDD recorder 10 (image converter) may change the position at which a frame block 601 is stored in the image track each time the frame block 601 is converted from a low resolution to a high resolution or from a high resolution to a low resolution. An example of the high resolution scene managing table 602 of this case is shown in FIG. 15A.

Alternatively, as shown in FIG. 14, the image converting unit 115 may reduce the resolution of all the frame blocks 601, and store the i frame of only such frame blocks 601 that are determined by the scene determining unit 116 to be necessary to store at a high resolution in different image tracks from that of moving image data. An example of the high resolution scene managing table 602 of this case is shown in FIG. 15B.

In the scene determining process, the scene determining unit 116 may determine whether to store an image at a high resolution or not based on other elements in the image, such as the size of letters included in the image, the size and the kind of an object included in the image, etc. Other than elements in an image, the scene determining unit 16 may also make this determination based on audio information recorded synchronously with images (e.g., the loudness of a sound, etc.)

In the embodiment described above, the mobile-device-use image data 112 starts being reproduced when the user selects a scene from the displayed thumbnails. However, needless to say, the mobile-device-use image data 112 may also be reproduced from its first frame block 601 in accordance with an instruction of the user, with no thumbnails displayed.

In the list displaying process, the list displaying unit 221 may store the acquired i frames in the secondary storage device 206 separately in the form of a list of still images. Therefore, even if the mobile-device-use image data 112 is deleted, still images having a high resolution can be viewed.

The embodiment described above is an example where the mobile-device-use image data 112 is transferred from the HDD recorder 10 to the cellular phone 20 and the mobile-device-use image data 112 stored in the secondary storage device 206 is reproduced. However, the mobile-device-use image data 112 may be reproduced by a streaming reproduction manner by which the data is reproduced as it is transferred from the HDD recorder 10 to the cellular phone 20.

The cellular phone 20 may have a feature for performing the image data converting process and convert image data such as content data that is acquired from another device into mobile-device-use image data 112.

The cellular phone 20 may convert an image shot by a camera 208 into mobile-device-use image data 112 and reproduce the image data obtained from the conversion.

By applying a program, it is possible to make an existing video signal recorder or the like function as the image converter according to the present invention. That is, an existing video signal recorder or the like, to which programs as executed by the CPU 103 described above are applied, can realize the functional configuration and processes described above by the programs being executed by a computer (CPU or the like) that controls this video signal recorder or the like. Likewise, by applying a program, it is possible to make an existing cellular phone or the like function as the image reproducer according to the present invention.

Such programs may be distributed in arbitrary manners, and distributed as stored in a recording medium such as a memory card or distributed via a communication network such as the Internet. By applying the programs distributed in these manners to a video signal recorder or the like or a cellular phone or the like by installing the programs thereon, it is possible to realize functions similar to those of the HDD recorder 10 or the cellular phone 20 described above.

In accordance with the present invention, by generating a low quality image from a high quality image, it is possible to reduce the size of the image data, and at the same time, upgrade a necessary portion. Therefore, a high-definition image can be presented to the user even when the image is zoomed up. Accordingly, the present invention can be applied to a cellular phone, an image recorder, a video camcorder, etc.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-293249 filed on Nov. 17, 2008 and including specification, claims, drawings and summary. The disclosure of the above Japanese Patent Application is incorporated herein by reference in its entirety.

What is claimed is:

1. An image converter, comprising an image converting unit and a determining unit,
   wherein the image converting unit sequentially acquires frame image groups each including at least one frame image from original image data that is constituted by these frame image groups, and outputs the at least one frame image included in each of the acquired frame image groups by converting an image quality of the at least one frame image based on a result of determination by the determining unit, thereby to generate a foreign-device-use image data that is constituted by the frame image groups including the at least one frame image, wherein the determining unit determines whether it is necessary to retain the at least one frame image of each frame image group at a first image quality based on whether the at least one frame image of the frame image group satisfies a predetermined condition, wherein the determining unit calculates a time interval between a reproduction start time of the frame image group that is currently a determination target and a reproduction start time of a most recent frame image group that has been determined as necessary to retain at the first image quality, and determines that it is unnecessary to retain the determination-target frame image group at the first image quality in a case where the time interval is shorter than a preset time period, wherein in a case where the determining unit determines that it is necessary to retain the at least one frame image of the frame image group at the first image quality, the image converting unit outputs the at least one frame image of the frame image group at the first image quality, and wherein in a case where the determining unit determines that it is unnecessary to retain the at least one frame image of the frame image group at the first image quality, the image converting unit outputs the at least one frame image of the frame image group at a second image quality.

2. The image converter according to claim 1, wherein the first image quality is higher than the second image quality.

3. The image converter according to claim 1, wherein the first image quality is equal to the image quality of the at least one frame image of each of the acquired frame image groups.

4. The image converter according to claim 1, wherein the determining unit performs determination only on a frame image that is decodable without requiring other frames of the at least one frame image included in each frame image group.

5. The image converter according to claim 1, wherein the determining unit calculates a degree of image similarity between the frame image group that is currently a determination target and a most recent frame image group that has been determined as necessary to retain at the first image quality, and determines that it is unnecessary to retain the determination-target frame image group at the first image quality in a case where the degree of image similarity is equal to or greater than a preset value.

6. The image converter according to claim 1, wherein the determining unit acquires a number of letters included in the at least one frame image of the frame image group that is currently a determination target, and determines that it is unnecessary to retain the frame image group at the first image quality in a case where the acquired number of letters is smaller than a preset number.

7. The image converter according to claim 1, further comprising an imaging unit that generates the original image data by imaging.

8. An image reproducer, comprising:

a reproducing unit that sequentially acquires frame image groups each including at least one frame image from image data that is constituted by these frame image groups, a frame image group that is designated by a user being acquired first, and reproduces the image data;

a storage unit that temporarily stores at least one frame image of each of the frame image groups, in a case where the frame image group has a first image quality;

a zooming unit that suspends reproduction of the image data in response to an instruction of the user, and displays at least one frame image that is temporarily stored by one of expanding and reducing the at least one frame image; and a determining unit that calculates a time interval between a reproduction start time of the frame image group that is currently a determination target and a reproduction start time of a most recent frame image group that has been determined as necessary to retain at the first image quality, and determines that it is unnecessary to retain the determination-target frame image group at the first image quality in a case where the time interval is shorter than a preset time period.

9. An image conversion/reproduction system, comprising an image converter and an image reproducer, wherein the image converter includes an image converting unit and a determining unit, wherein the image converting unit sequentially acquires frame image groups each including at least one frame image from original image data that is constituted by these frame image groups, and outputs the at least one frame image included in each of the acquired frame image groups by converting an image quality of the at least one frame image based on a result of determination by the determining unit, thereby to generate a foreign-device-use image data that is constituted by the frame image groups including the at least one frame image, wherein the determining unit determines whether it is necessary to retain the at least one frame image of each frame image group at a first image quality based on whether the at least one frame image of the frame image group satisfies/satisfy a predetermined condition, wherein in a case where the determining unit determines that it is necessary to retain the at least one frame image of the frame image group at the first image quality, the image converting unit outputs the at least one frame image of the frame image group at the first image quality, wherein in a case where the determining unit determines that it is unnecessary to retain the at least one frame image of the frame image group at the first image quality, the image converting unit outputs the at least one frame image of the frame image group at a second image quality, wherein in a case where the determining unit determines any frame image group as necessary to retain at the first image quality, the image converting unit arranges position information and a reproduction start time of a predetermined frame image of the frame image group to be stored in the storage unit, the image reproducer includes a list displaying unit that displays the frame image having the position information and the reproduction start time in form of a list, and the user designates any frame image that is displayed by the list displaying unit in form of a list, wherein the image reproducer includes a reproducing unit, a storage unit, and a zooming unit, wherein the reproducing unit sequentially acquires the frame image groups from the foreign-device-use image data, a frame image group that is designated by a user being acquired first, and reproduces the foreign-device-use image data, wherein the storage unit temporarily stores at least one frame image of each of the frame image groups, in a case where the frame image group has the first image quality, and wherein the zooming unit suspends reproduction of the foreign-device-use image data in response to an instruction of the user, and displays the at least one frame image that is temporarily stored by expanding or reducing the at least one frame image.

10. A computer-readable non-transitory recording medium storing a program that controls a computer to function as an image converter including an image converting unit and a determining unit, in a manner that the image converting unit sequentially acquires frame image groups each including at least one frame image from original image data that is constituted by these frame image groups, and outputs the at least one frame image included in each of the acquired frame image groups by converting an image quality of the at least one frame image based on a result of determination by the determining unit, thereby to generate a foreign-device-use image data that is constituted by the frame image groups including the at least one frame image, the determining unit determines whether it is necessary to retain the at least one frame image of each frame image group at a first image quality based on whether the at least one frame image of the frame image group satisfy a predetermined condition, the determining unit acquires a number of letters included in the at least one frame image of the frame image group that is currently a determination target, and determines that it is unnecessary to retain the frame image group at the first image quality in a case where the acquired number of letters is smaller than a preset number, in a case where the determining unit determines that it is necessary to retain the at least one frame image of the frame image group at the first image quality, the image converting unit outputs the at least one frame image of the frame image group at the first image quality, and in a case where the determining unit determines that it is unnecessary to retain the at least one frame image of the frame image group at the first image quality, the image converting unit outputs the at least one frame image of the frame image group at a second image quality.

11. A computer-readable non-transitory recording medium storing a program that controls a computer to function as:

a reproducing unit that sequentially acquires frame image groups each including at least one frame image from image data that is constituted by these frame image groups, a frame image group that is designated by a user being acquired first, and reproduces the image data;

a storage unit that temporarily stores at least one frame image of each of the frame image groups, in a case where the frame image group has a first image quality;

a zooming unit that suspends reproduction of the image data in response to an instruction of the user, and displays at least one frame image that is temporarily stored by expanding or reducing the at least one frame image, and a determining unit that calculates a time interval between a reproduction start time of the frame image group that is currently a determination target and a reproduction start time of a most recent frame image group that has been determined as necessary to retain at the first image quality, and determines that it is unnecessary to retain the determination-target frame image group at the first image quality in a case where the time interval is shorter than a preset time period.

12. An image converter, comprising an image converting unit and a determining unit, wherein the image converting unit sequentially acquires frame image groups each including at least one frame image from original image data that is constituted by these frame image groups, and outputs the at least one frame image included in each of the acquired frame image groups by converting an image quality of the at least one frame image based on a result of determination by the determining unit, thereby to generate a foreign-device-use image data that is constituted by the frame image groups including the at least one frame image, wherein the determining unit determines whether it is necessary to retain the at least one frame image of each frame image group at a first image quality based on whether the at least one frame image of the frame image group satisfies a predetermined condition, wherein the determining unit acquires a number of letters included in the at least one frame image of the frame image group that is currently a determination target, and determines that it is unnecessary to retain the frame image group at the first image quality in a case where the acquired number of letters is smaller than a preset number, wherein in a case where the determining unit determines that it is necessary to retain the at least one frame image of the frame image group at the first image quality, the image converting unit outputs the at least one frame image of the frame image group at the first image quality, and wherein in a case where the determining unit determines that it is unnecessary to retain the at least one frame image of the frame image group at the first image quality, the image converting unit outputs the at least one frame image of the frame image group at a second image quality.

13. A computer-readable non-transitory recording medium storing a program that controls a computer to function as an image conversion/reproduction system, comprising an image converter and an image reproducer, in a manner that the image converter includes an image converting unit and a determining unit, the image converting unit sequentially acquires frame image groups each including at least one frame image from original image data that is constituted by these frame image groups, and outputs the at least one frame image included in each of the acquired frame image groups by converting an image quality of the at least one frame image based on a result of determination by the determining unit, thereby to generate a foreign-device-use image data that is constituted by the frame image groups including the at least one frame image, the determining unit determines whether it is necessary to retain the at least one frame image of each frame image group at a first image quality based on whether the at least one frame image of the frame image group satisfies/satisfy a predetermined condition, in a case where the determining unit determines that it is necessary to retain the at least one frame image of the frame image group at the first image quality, the image converting unit outputs the at least one frame image of the frame image group at the first image quality, in a case where the determining unit determines that it is unnecessary to retain the at least one frame image of the frame image group at the first image quality, the image converting unit outputs the at least one frame image of the frame image group at a second image quality, and in a case where the determining unit determines any frame image group as necessary to retain at the first image quality, the image converting unit arranges position information and a reproduction start time of a predetermined frame image of the frame image group to be stored in the storage unit, the image reproducer includes a list displaying unit that displays the frame image having the position information and the reproduction start time in form of a list, and the user designates any frame image that is displayed by the list displaying unit in form of a list, wherein the image reproducer includes a reproducing unit, a storage unit, and a zooming unit, wherein the reproducing unit sequentially acquires the frame image groups from the foreign-device-use image data, a frame image group that is designated by a user being acquired first, and reproduces the foreign-device-use image data, wherein the storage unit temporarily stores at least one frame image of each of the frame image groups, in a case where the frame image group has the first image quality, and wherein the zooming unit suspends reproduction of the foreign-device-use image data in response to an instruction of the user, and displays the at least one frame image that is temporarily stored by expanding or reducing the at least one frame image.

* * * * *